(12) United States Patent
Lajoie

(10) Patent No.: US 10,437,136 B2
(45) Date of Patent: Oct. 8, 2019

(54) MODULAR VIDEO ATTACHMENT WITH VIBRATION DAMPENING

(71) Applicant: Timothy P. Lajoie, Templeton, MA (US)

(72) Inventor: Timothy P. Lajoie, Templeton, MA (US)

( * ) Notice: Subject to any disclaimer, the term of this patent is extended or adjusted under 35 U.S.C. 154(b) by 290 days.

(21) Appl. No.: 15/217,477

(22) Filed: Jul. 22, 2016

(65) Prior Publication Data

US 2017/0168375 A1 Jun. 15, 2017

Related U.S. Application Data

(60) Provisional application No. 62/179,891, filed on May 22, 2015.

(51) Int. Cl.
*G03B 17/56* (2006.01)
*F16M 13/02* (2006.01)
*F16F 1/36* (2006.01)
*F16M 11/14* (2006.01)

(52) U.S. Cl.
CPC .............. *G03B 17/561* (2013.01); *F16F 1/36* (2013.01); *F16M 11/14* (2013.01); *F16M 13/02* (2013.01); *G03B 17/566* (2013.01)

(58) Field of Classification Search
CPC ... G03B 17/561; G03B 17/563; F41B 5/1492; F41G 11/002
USPC .................................................. 248/559, 562
See application file for complete search history.

(56) References Cited

U.S. PATENT DOCUMENTS

| | | | |
|---|---|---|---|
| 2,898,068 A | 8/1959 | Warren | |
| 3,661,376 A | 5/1972 | Hill et al. | |
| 5,031,872 A * | 7/1991 | Vance | F16F 9/0481 248/187.1 |
| 5,118,058 A | 6/1992 | Richter | |
| 5,187,744 A | 2/1993 | Richter | |
| 5,362,046 A * | 11/1994 | Sims | A63B 60/54 473/300 |
| 5,465,932 A | 11/1995 | Richter | |
| D390,849 S | 2/1998 | Richter et al. | |
| 6,286,796 B1 | 9/2001 | Pugliesi | |
| 7,090,416 B2 * | 8/2006 | Mootz | F16M 11/041 248/187.1 |
| 7,143,986 B1 * | 12/2006 | Austin | F41A 23/08 248/187.1 |
| 7,241,060 B2 * | 7/2007 | Mootz | F16M 11/041 248/187.1 |
| D582,894 S | 12/2008 | Richter | |
| 7,594,352 B2 * | 9/2009 | Holmberg | F16M 13/00 248/309.1 |
| 7,604,420 B2 * | 10/2009 | Moody | F41B 5/14 396/419 |
| 7,739,822 B1 * | 6/2010 | Holmberg | F41A 35/00 124/86 |
| 7,780,363 B1 * | 8/2010 | Holmberg | G03B 17/00 124/88 |
| 8,024,884 B2 * | 9/2011 | Holmberg | F41C 27/00 42/124 |
| 8,161,674 B2 * | 4/2012 | Holmberg | F41C 27/00 42/124 |

(Continued)

*Primary Examiner* — Bradley Duckworth
(74) *Attorney, Agent, or Firm* — Regan L. Trumper; William W. Cochran; Cochran Freund & Young LLC

(57) ABSTRACT

Disclosed is a system and method for mounting video equipment to an object and providing vibration dampening.

9 Claims, 11 Drawing Sheets

(56) References Cited

U.S. PATENT DOCUMENTS

| | | | | |
|---|---|---|---|---|
| 8,454,246 | B2 * | 6/2013 | Wood | F16M 11/10 |
| | | | | 248/182.1 |
| 8,585,205 | B2 * | 11/2013 | Greaves | F16M 11/046 |
| | | | | 348/376 |
| 8,893,701 | B1 * | 11/2014 | Entrup | G03B 29/00 |
| | | | | 124/86 |
| 8,939,140 | B2 * | 1/2015 | Mancini | F41B 5/1426 |
| | | | | 124/86 |
| 9,605,795 | B2 * | 3/2017 | Le | F16M 13/04 |
| 9,671,191 | B1 * | 6/2017 | Sullivan | F41G 11/002 |
| 9,835,934 | B2 * | 12/2017 | Matt | G03B 17/561 |
| 2003/0094168 | A1 * | 5/2003 | Sims | F41B 5/1426 |
| | | | | 124/89 |
| 2012/0106941 | A1 * | 5/2012 | Greaves | F16M 11/046 |
| | | | | 396/421 |
| 2016/0327847 | A1 * | 11/2016 | Yang | B64D 47/08 |

\* cited by examiner

MODULAR VIDEO ATTACHMENT WITH VIBRATION DAMPENING

CROSS-REFERENCE TO RELATED APPLICATION

This application claims the benefit of provisional application Ser. No. 62/179,891, filed May 22, 2015, which application is hereby specifically incorporated herein by reference for all that it discloses and teaches.

BACKGROUND

Action cameras and video devices, including cell phones and small portable video cameras such as Go-Pro® cameras, may be mounted on objects such as archery equipment, firearms, crossbows, cars, recreational vehicles, ATV's, boats, planes and other items. A mounted camera or video device may vibrate during use of the item on which it is mounted.

BRIEF SUMMARY OF THE INVENTION

An embodiment of the invention may therefore comprise a [to be completed upon finalization of claims].

An embodiment of the invention may further comprise a [to be completed upon finalization of claims].

DETAILED DESCRIPTION OF THE INVENTION

Figure 1:
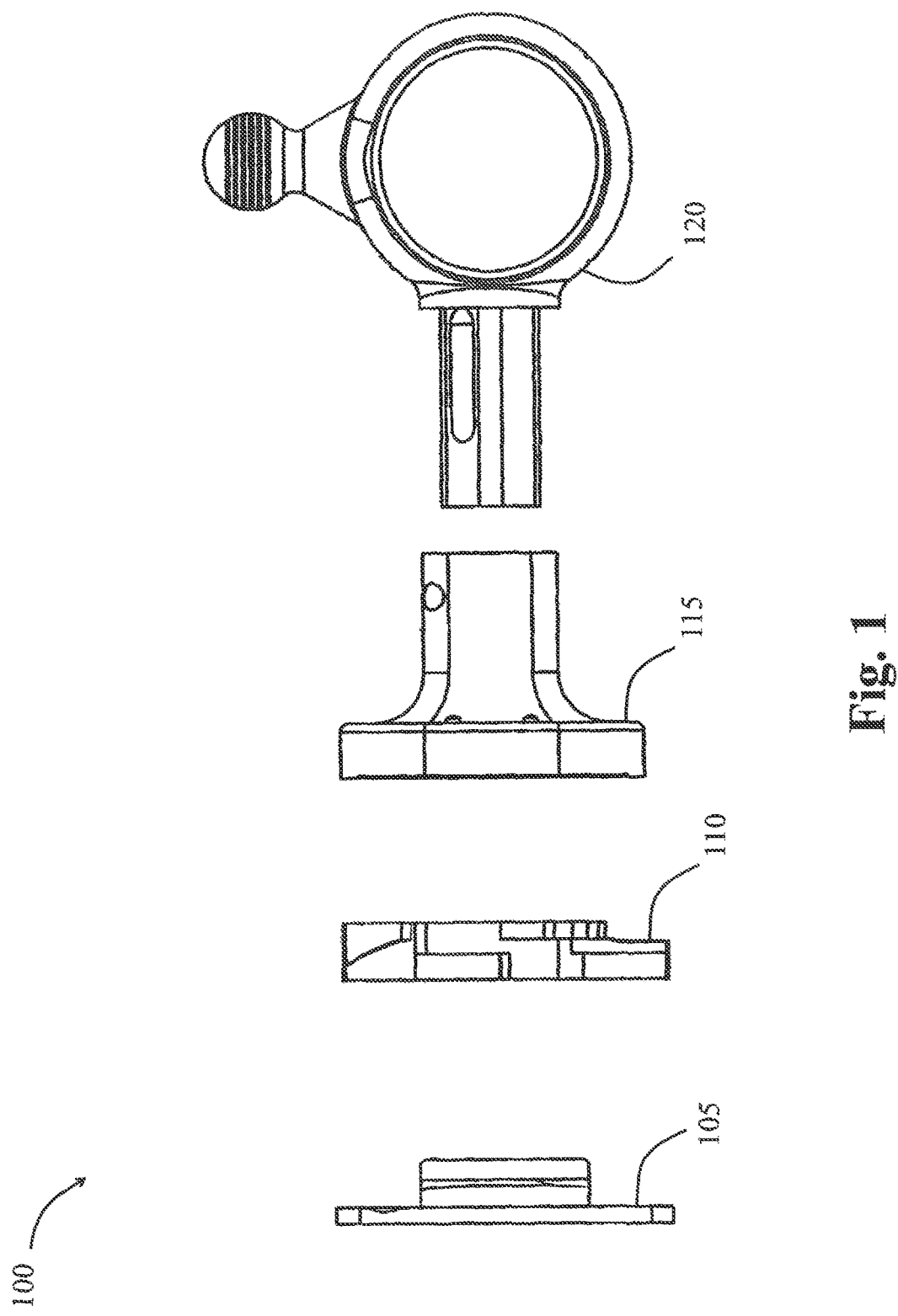
FIG. 1 shows and exploded view of an embodiment of a vibration dampening mount for video equipment.

FIG. 1 shows and exploded view of an embodiment of a vibration dampening mount for video equipment. The mount 100 comprises a female replaceable base 105, a male quick release replaceable base 110, a base pedestal 115 and a ball with power lines and acceptor ring 120. The female replaceable base 105 accepts screws (not shown in FIG. 1) on a bottom portion to accept the male quick release replaceable base 110.

Figure 2:
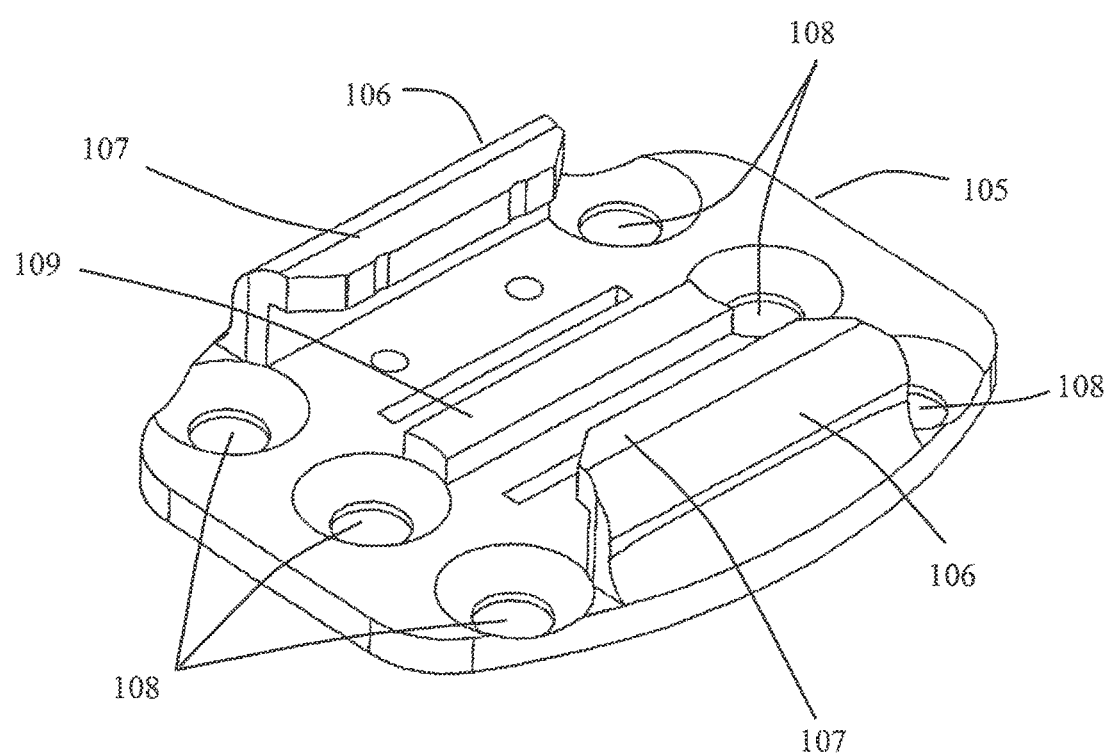
FIG. 2 shows an angled view of a female replaceable base.

FIG. 2 shows an angled view of a female replaceable base. The female replaceable base 105 comprises a pair of opposed receivers 106, each with a lip 107 for securing the male quick release replaceable base 110. Three sets of screw holes 108 are shown. The three sets of screw holes 108 are designed to fit pre-drilled holes on a bow when the sight is designed to attach. There may also be a portion of sticky tape for screw-less attachment and there may be slots for a strap-on application. A centering piece 109 may allow for centering of the male quick release replaceable base 110.

Figure 3:
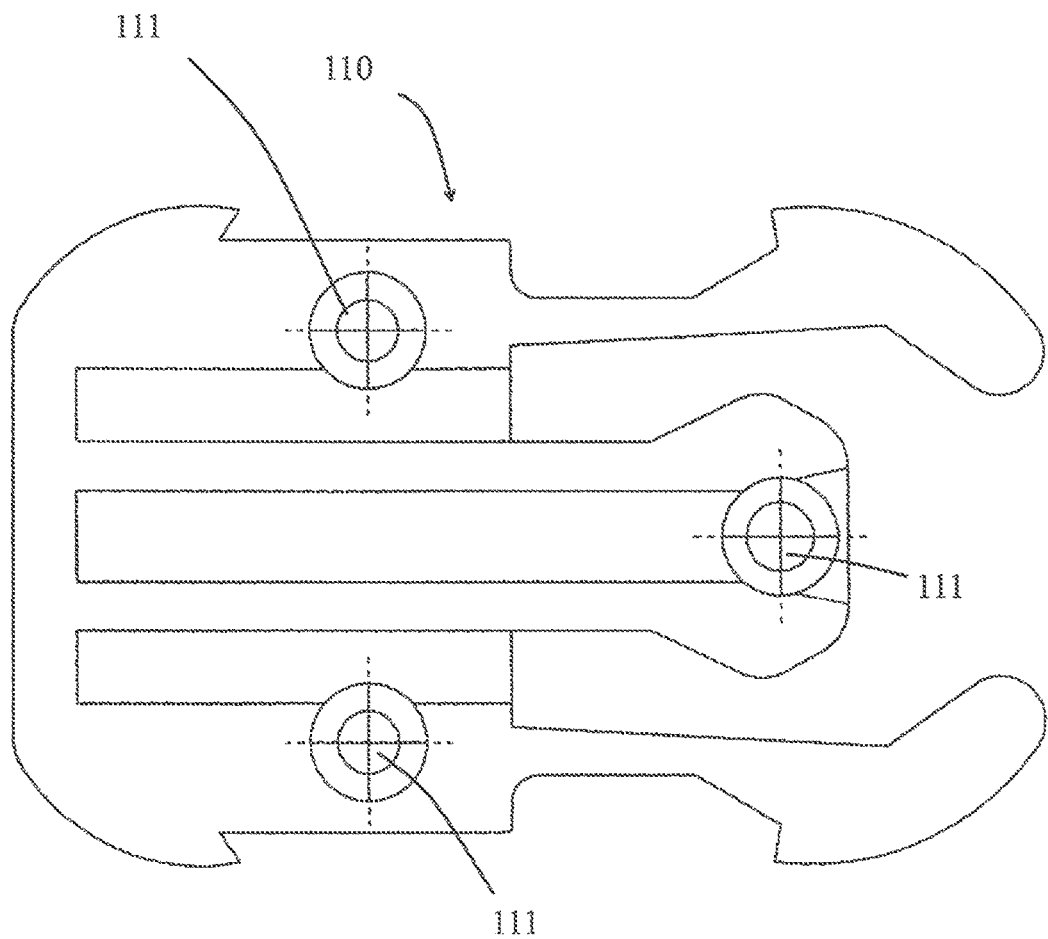
FIG. 3 shows a top view of a male quick release replaceable base.

FIG. 3 shows a top view of a male quick release replaceable base. The male quick release replaceable base 110 comprises three screw holes 111. The screw holes 111 allow the base 110 to be quickly removed from its female replaceable base 110. The male quick release replaceable base 110 will fit into the opening between opposed receivers 106 of the female replaceable base 105 and over the centering piece 109.

Figure 4:
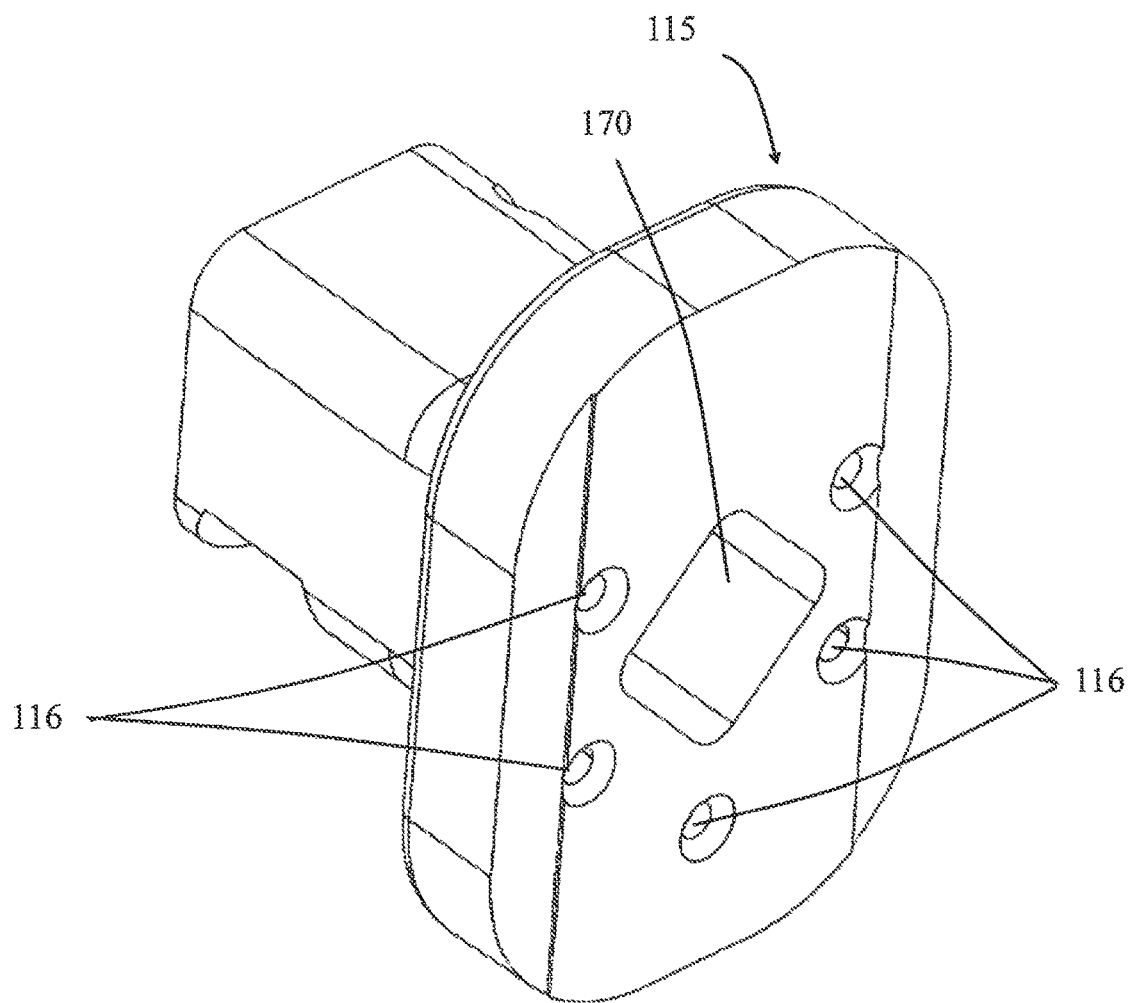
FIG. 4 shows an angled view of a base pedestal.

FIG. 4 shows an angled view of a base pedestal. The base pedestal 115 accepts screws at screw holes 116. The base pedestal 115 has an angled channel inside to accept the ball and vibration dampener acceptor 120.

Figure 5:
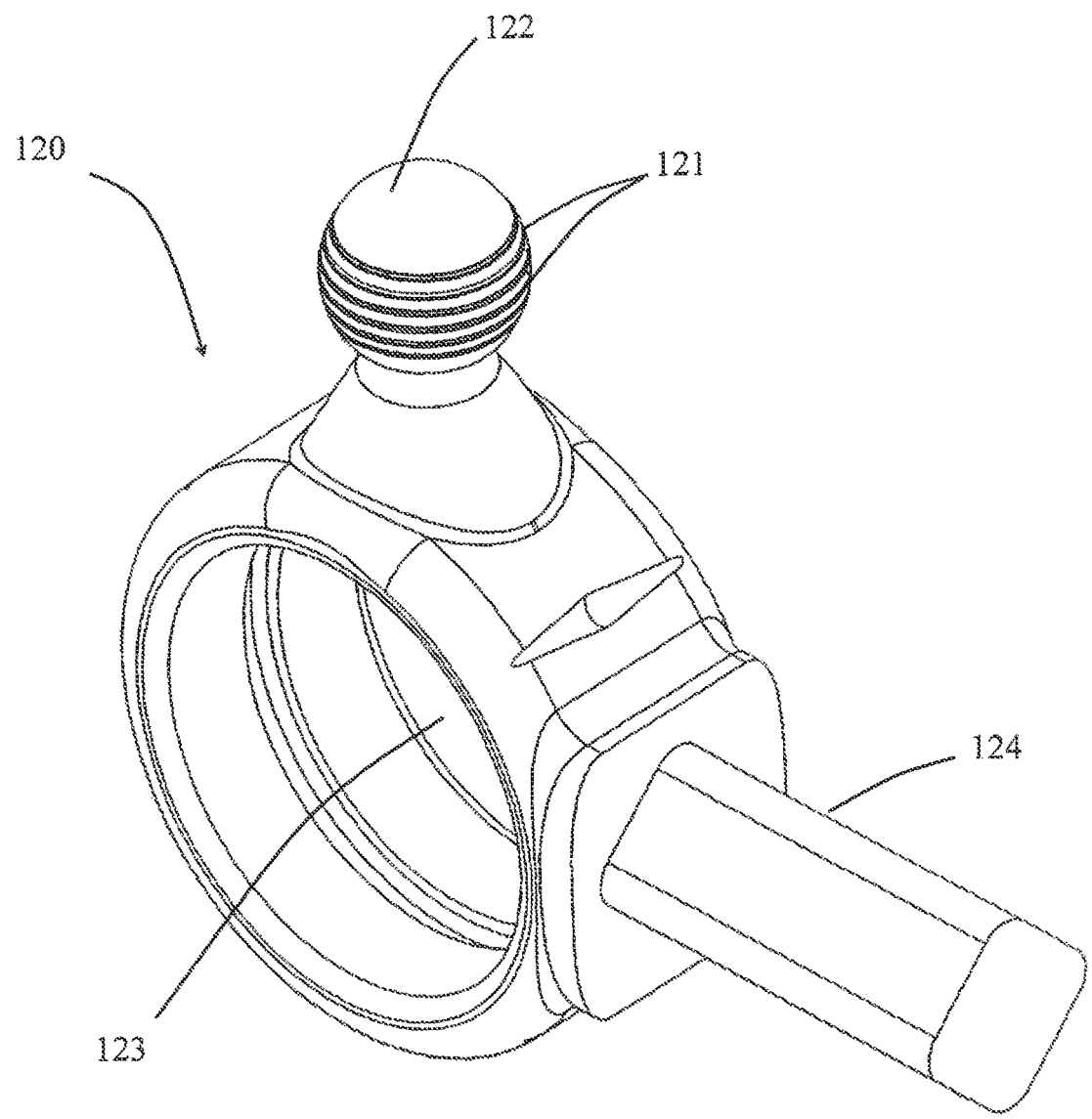
FIG. 5 shows an angled view of a ball with power lines and acceptor ring.

FIG. 5 shows an angled view of a ball with power lines and acceptor ring. The acceptor 120 comprises power lines 121 on the ball 122. The power lines 121 add to the holding strength of the ball socket when tightened. A round opening 123 allows for acceptance of a vibration dampener in a position to maximize dampening. Positioning of the opening 123 also allows for easy insertion and replacement of a dampener if needed. A shaft 124 is insertable into the angled channel inside the base pedestal 115. The shaft 124 is substantially square and is described as angled herein to account for the non-horizontal and non-vertical aspect of its sides. The shaft 124 is angled to add stability.

Figure 6:
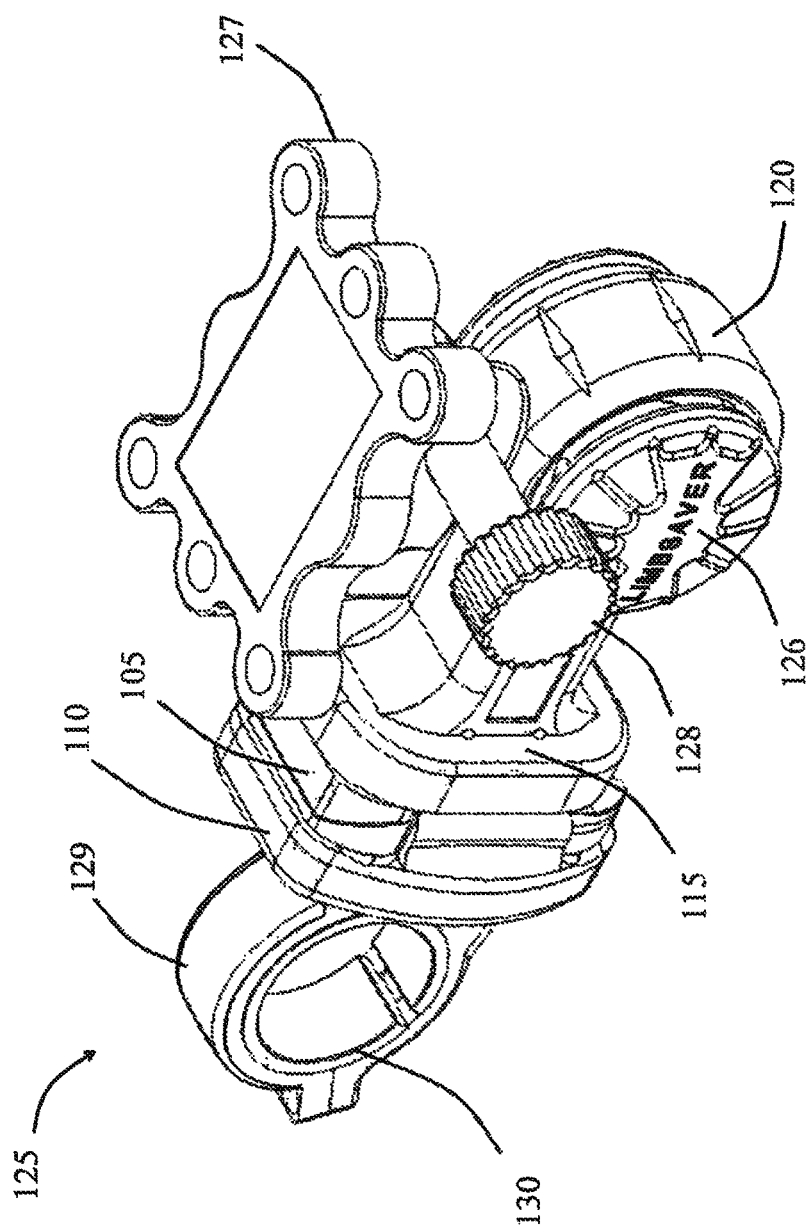
FIG. 6 shows an angled view of a mount with vibration dampening.

FIG. 6 shows an angled view of a mount with vibration dampening. The mount 125 comprises a vibration dampener 126, a gimbal 127, a thumbscrew 128, a ball with power lines and vibration dampener acceptor 120, a male replaceable base 110, a base pedestal 115, a female base 105, and a round tubular adaptor 129.

The vibration dampener 126 absorbs vibrations and minimizes felt vibration, as well as other types of vibration. Vibration reduction may be as much as 70%. The gimbal 127 may be a universal multi-camera (video equipment) mount. The gimbal 127 accepts multiple styles of video equipment, or may be specifically designed for a specific piece of video equipment. The gimbal 127 may be a two piece design which allows 360 degree rotation along with upward and downward adjustable positioning to lock into place with a twist of the thumbscrews 128. The thumbscrews allow a user to loose and tighten the gimbal 126 around the ball socket 122 to secure the video equipment in position. A round tubular adapter 129 allows attachment by the user to secure the mount to the round objects of multiple diameters such as rifle scopes, bicycle handle bars, tubes, roll bars, pipes, and other objects. The adaptor base 129 may be comprised of two or more pieces with the pieces being held together around an object with a securing mechanism. The securing mechanism may be screws, a band or clasps. Those skilled in the art will understand the means to secure two or more pieces together around an object. A rubber insert 130 may be inserted inside the adaptor base 129 to allow the round (tubular accepting means) to securely fit different diameter objects. The insert 130 may be rubber or other material. The insert 130 may be a pliable material or otherwise. The insert 130 may also be formed so that it conforms to a non-circular object. The object may have a square, or other shape, at a connection point. The insert may be also specifically made to conform to any odd shape.

Figure 7:
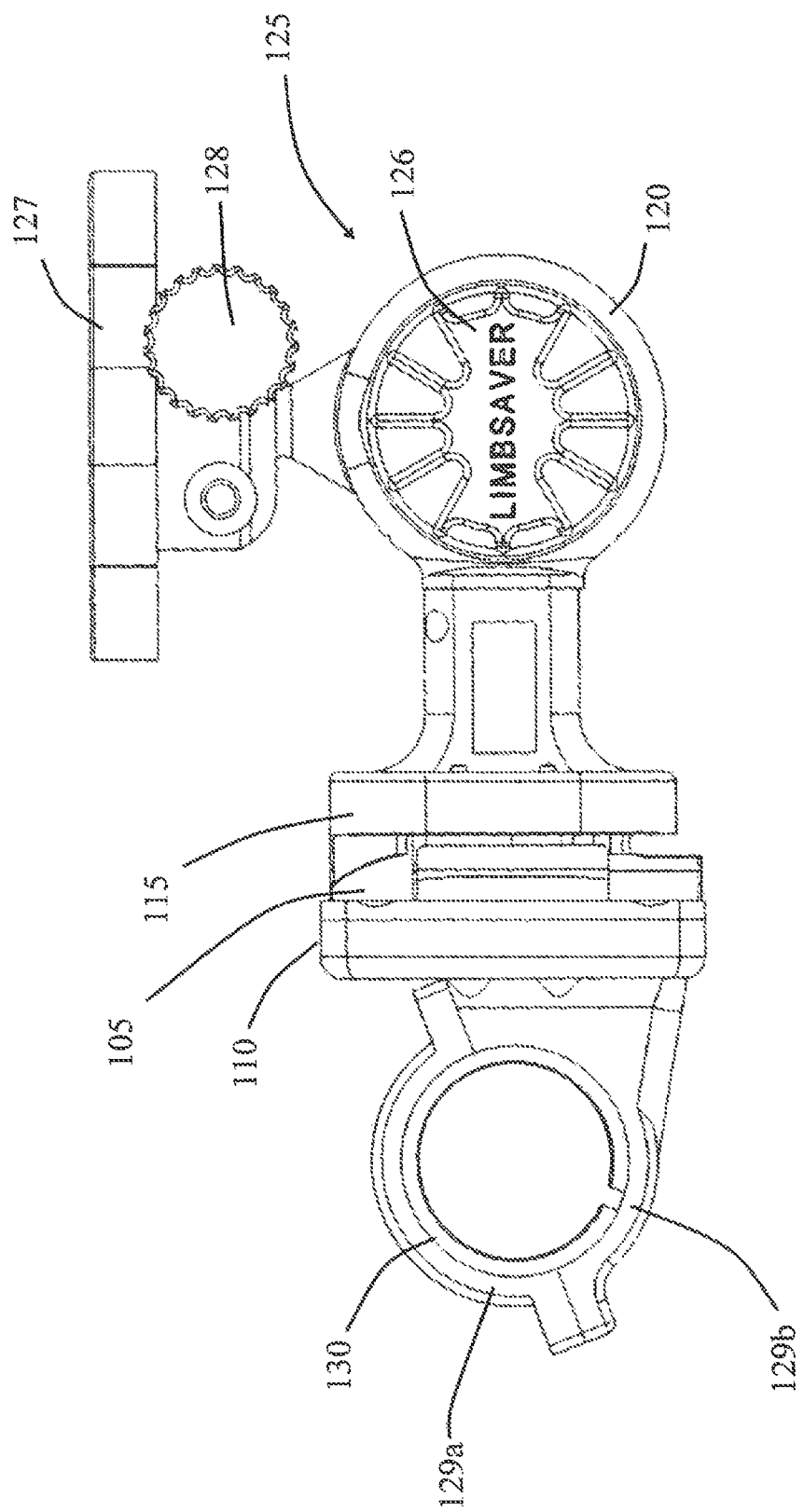
FIG. 7 shows a front view of a mount with vibration dampening.

FIG. 7 shows a front view of a mount with vibration dampening. The mount 125 comprises a vibration dampener 126, a gimbal 127, a thumbscrew 128, a ball with power lines and vibration dampener acceptor 120, a male replaceable base 110, a base pedestal 115, a female base 105, and a round tubular adaptor 129.

Figure 8:
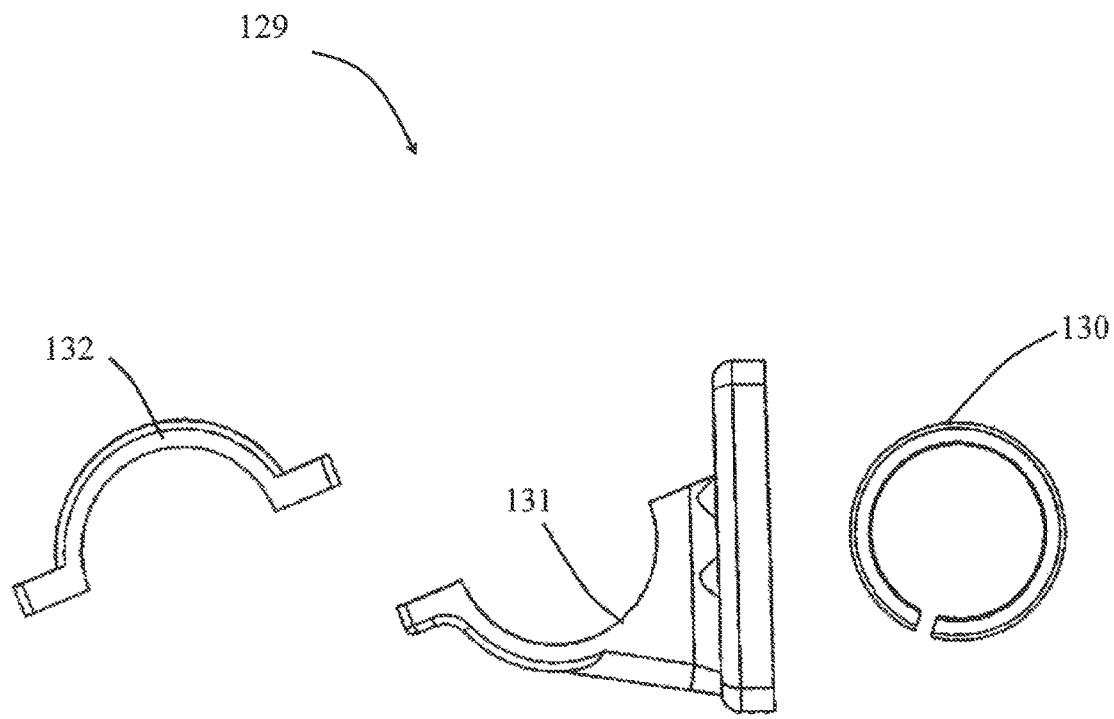
FIG. 8 shows a two piece construction of a round tubular adaptor.

FIG. 8 shows a two piece construction of a round tubular adaptor. The adaptor 129 comprises a round tubular base 131 and a round tubular adaptor top 132. An insert 130 will fit inside the adaptor to ensure proper fit for varying sizes of objects to which the adaptor will be connected to. While a round adaptor 129 is shown, it is understood that the adaptor 129 may be differently shaped, such as square or oval, for example, and that the insert 130 may likewise be differently shaped to accommodate a differently shaped adaptor 129 and differently shaped objects.

Figure 9:
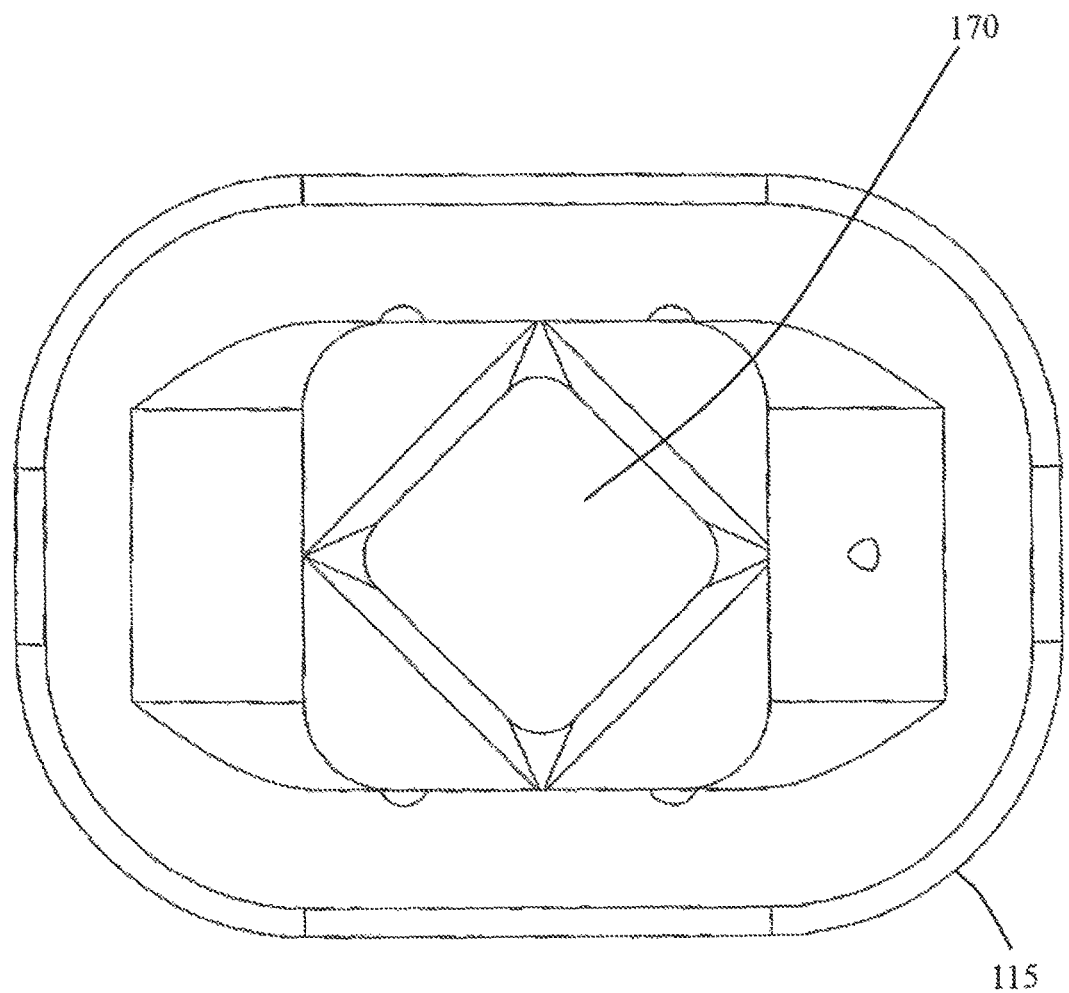
FIG. 9 shows an end view of a base pedestal.

FIG. 9 shows an end view of a base pedestal. The base pedestal 115 comprises an angled channel 170 to accept the ball and vibration dampener acceptor 120 (FIG. 1) and 140 (FIG. 10 below).

Figure 10:
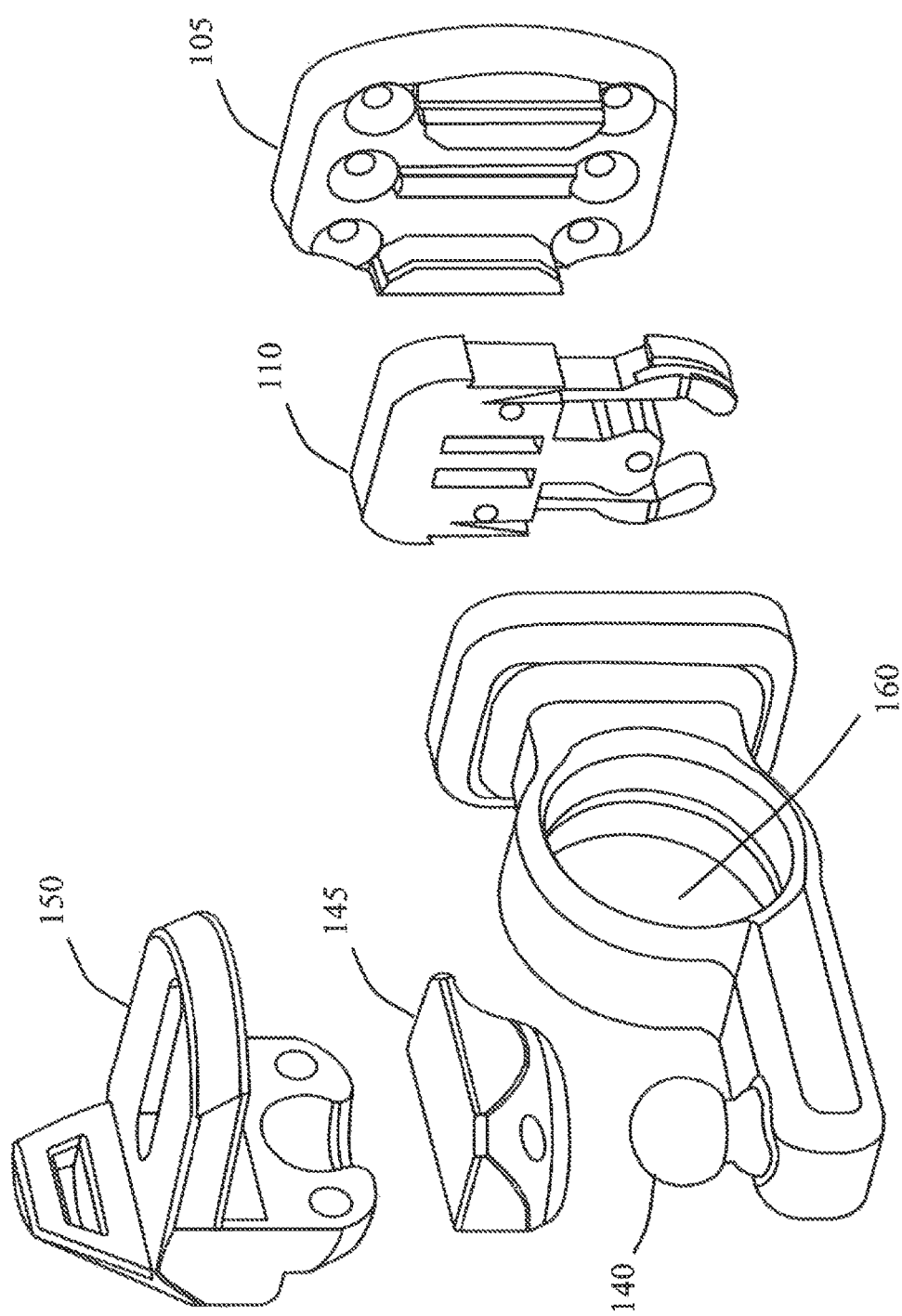
FIG. 10 shows an exploded embodiment of a mount with vibration dampening.

FIG. 10 shows an exploded embodiment of a mount with vibration dampening. The mount comprises a ball with power lines and pedestal 140, a first ball socket connection 150, a second ball socket connection 145, a male quick release 110 and a female slotted acceptor 105 that accepts the male end. In the embodiment shown, the ball with power lines and pedestal 140 comprises a dampener acceptor slot 160. The ball with power lines and dampener acceptor 120 and base pedestal 115 of FIG. 1 is combined in FIG. 2 into a single piece, the ball with power lines and pedestal 140. A gimbal, not shown in FIG. 10, is connectable to the first ball socket connection 150. As shown in FIG. 10, the first ball socket connection 150 has a wider radius around the thumbscrew hole to accept the plastic base that the thumbscrew has over an actual metal screw. The hole is not threaded allowing the thumbscrew to spin freely. This hole is on the bottom and the radius is on the rear as shown. The top hole as shown is a threaded hole. The first ball socket connection 150 hole shown on the top, or right, as shown is a threaded hole. The second ball socket connection 145 has a wider flat radius on the right side as shown and is not threaded. The second ball socket connection 145 left side hole is a threaded hole. This allows the gimbal 127 to be reversible, allowing the back bone to be forward, or rear facing. This allows longer based cameras to be applied and to allow the backbone to assist in stability on a higher rising application such as a cell phone mount.

Figure 11:
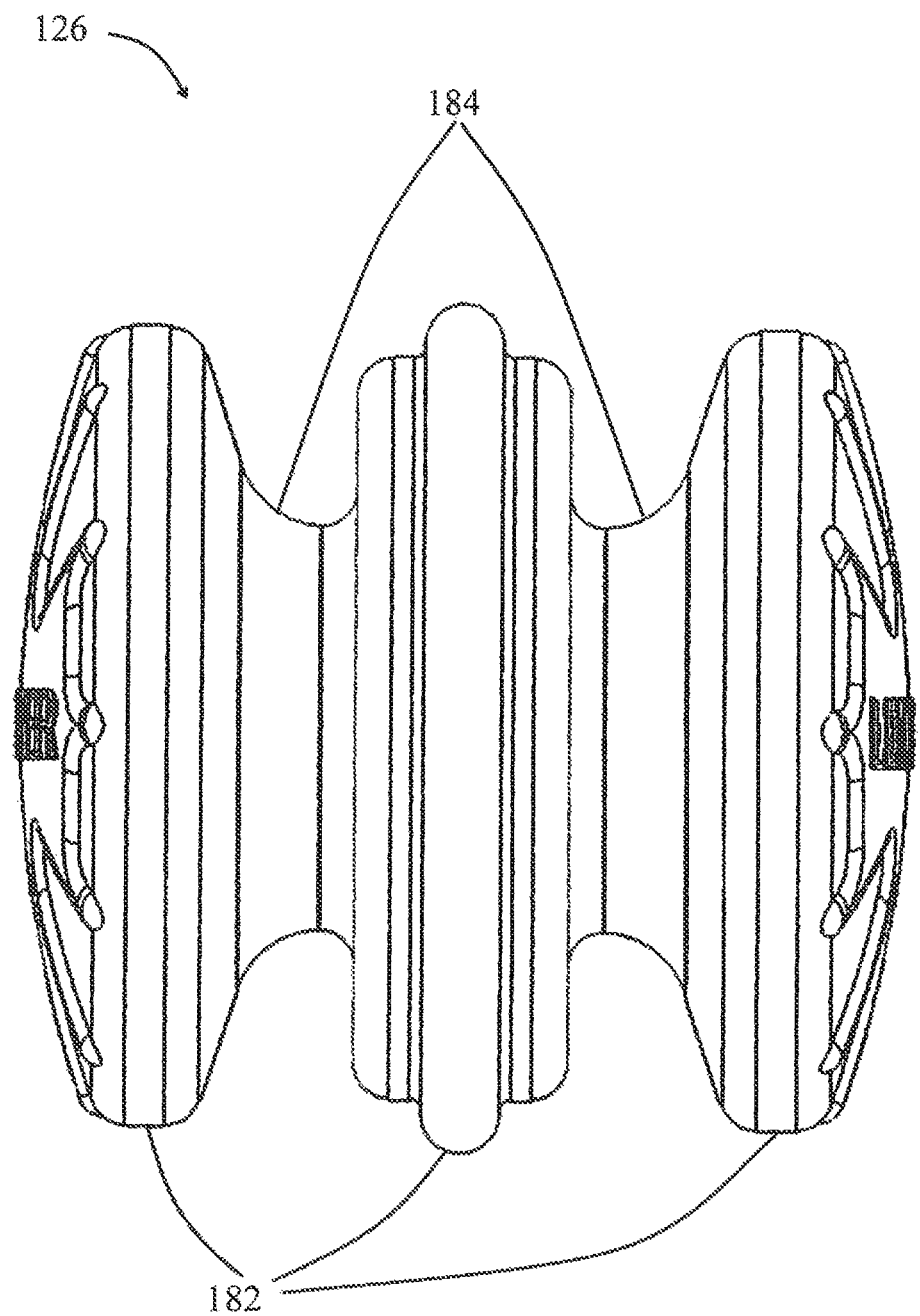
FIG. 11 shows a dampener.

FIG. 11 shows a dampener. The dampener 126 comprises a set of uni-axial cylinders 182 situated in a stacked relationship. The dampener 126 may have bushing cylinders 184 that are situated in between the larger uni-axial cylinders. The bushing cylinders 184 may be of a smaller radius than the larger uni-axial cylinders 182. Each of the cylinders of the larger uni-axial cylinders 182 may also be of different radii.

Action cameras and video equipment are often used to record movement in sports and in high motion activities. These actions often create large amounts of vibration. When the vibration becomes large enough, it is often the cause of bad quality video recordings, or blurry still shots. The placement of a vibration dampening device on a mount for video equipment may help reduce, felt vibrations and allow for improved recordings and still shots. Lessening of vibrations may also allow for reduced wear and tear on the video equipment.

Embodiments of the current invention comprise an action camera or other video equipment mounting system with one or more of a replaceable quick release base, multiple camera mounting that allows forward and reverse video recording, multiple attachment means, vibration dampening strategically placed for maximum effect of reducing the amount of vibration transmitted to the cameras. Embodiments of the invention simplify the mounting of action video equipment to multiple surfaces such as helmets, walls, archery equipment, guns, bicycles, and handlebars. Other types of surfaces may be mention within this description and those skilled in the art will understand even further uses of mounts embodied by this invention. Vibration is transferred to an action video equipment and impacts the quality of the images recorded. In embodiments of the invention, a vibration dampener is strategically placed in a central location between the video equipment and the mount. The dampener greatly reduces the vibration transferred to the camera.

Embodiments of the invention simplify the mounting of action video equipment and allow that the video equipment be directed according to the desires of a user. Embodiments of the mount thereby include a ball and socket tripod head that may comprise power lines cut horizontally, or otherwise, on the ball. The power lines add horizontal holding power to the socket compared to a smooth ball. The ball socket also allows multi-directional tripod like adjustability.

Embodiments of the invention also add horizontal length to an arm of the video equipment base. Horizontal length enables a user to clear an obstruction of the video equipment view or to otherwise get a clear view of the subject to be recorded by the video equipment. A set screw that allows tightening and loosening of the base allows the horizontal length and the ball socket pieces allow the ball socket arm to extend outward offering horizontal adjustment enabling a user to clear obstructions.

Embodiments of the invention allow for ease in attaching action video equipment to multiple surfaces on multiple applications. A replaceable quick release base in embodiments of the invention allow a user to quickly attach and remove the mount. This allows the user to use one bracket on multiple applications without time consuming transitions. The quick release base (male end) and the receiver (female end) are replaceable. In the event that these components break due to the three screw application, or otherwise, easy replacement of the two components allows easy replacement and ease in transition.

A visco-elastic vibration dampening system added to a video mount may provide dampening to both the felt and heard vibration of a system in action. Alternative vibration dampening systems may also be used. A system in action may include objects such as archery equipment, firearms, crossbows, cars, recreational vehicles, ATV's, boats, planes and other items. It is understood by those skilled in the art that such systems may also include other types of systems not listed above but which may lend themselves to video mounting. It is also understood that the term video is intended to include all means of photographic technology. This may include specialized video equipment, smartphone cameras, still photography equipment including various types of cameras and smartphones and other types of equipment.

As noted above, vises-elastic polymers may be introduced into a mount that holds a video system. Types of materials may include neoprene, sorbothane, polyurethanes, rubber, Poron®, polydamp, nitril, and other materials known to those skilled in the art. A preferred material is NAVCOM™ (Noise and Vibration Control Material). NAVCOM is a highly effective vibration control material that absorbs the transmission of vibration throughout the audio frequency spectrum from 10 to 30,000 hz. NAVCOM provides absorption properties and metamorphic abilities that serve to minimize noise and vibration. NAVCOM™ is an elastic, amorphous, rubber-like substance. It has a very low natural frequency that is lower than the audio frequency bandwidth. The peak amplitude at its internal resonant frequency is relatively low and the curve has a sharp fall-off, far lower than the audio frequency bandwidth. This makes it ideal for the purposes of sound deadening, since the effect of energies between the frequencies of 10 and 30,000 hertz is minimal. Various materials may have different qualities that may be suitable for different environments. For instance, nitrile rubber is a copolymer of butadiene and acrylonitrile. In addition to excellent elastomeric properties, nitrile rubber is resistant to oil, caustics and aliphatic hydrocarbons. Nitrile rubber is not suitable for solvents and chlorinated hydrocarbons. Other materials may be resistant, or susceptible to, various environments and temperature ranges.

Dampening materials may be implanted in a mounted dampener. The dampening mechanism may be a pad, a grommet, a dampener, a bumper, a bushing, rings, or other configuration as those skilled in the art will understand.

The dampening materials may be positioned in the mounted dampening mechanism to maximize vibration reduction. A centered point of application may best maximize vibration reduction since that may be where the most vibration is exerted on the video equipment. Those skilled in the art will understand the proper placement of the dampening material based on a particular usage and through a normal amount of experimentation. In many situations, a centered dampener in the mount, relative to the attachment of the dampener, and formed by a collapsible core in the mold, may provide fast stopping capabilities to the mount. In such situations, the dampener may be equal in size and shape on either side of the mount.

In many situations, balancing the mount relative to the back and front, and side to side, results in an equal distribution of vibration. Further, application of the dampener material, such as a vises-elastic polymer, to the base of the camera platform may decrease the felt, seen, and heard vibration delivered through the device on which the video equipment is mounted.

Additional dampening may be accomplished by applying a stick-on style of dampener in areas that can support such a dampener. Those skilled in the art will understand the use of stick on style dampeners and their application.

A ball and socket attachment with a gimbal attachment for a video equipment, such as a tripod and camera, may be used with embodiments of the invention. In order to increase the holding power of a ball and socket arrangement, the ball and socket may be manufactured to comprise power lines scribed into the ball and that are equally spaced, or essentially equally spaced, and cut horizontally. The ball and socket may be manufactured with power lines by injection molding. Those skilled in the art will understand methods of manufacturing power lines in a ball and socket arrangement.

When the gimbal is tightened around the ball, the amount of flexion in the polymer used for the ball will determine the tension created as the gimbal squeezes around the power lines. Linear areas will be created that have more lbs. per square inch in making a secure horizontal hold. Further, the memory of the polymer used will differ from polymer to polymer. This memory will determine the depth and size of the power lines utilized in the ball. The power lines may be cut in any shape.

Many different styles and designs of video equipment may be desired to mount to various equipment like archery equipment, firearms, crossbows, RV's, boats, planes, cars, and other equipment that may have vibrations when used. With any style or design, quick attachment and detachment of the mount may be obtained with embodiments of the invention. An embodiment of the invention may utilize a three screw base as shown in the figures that is universally attached to any manufacturer's style quick release bases. Multiple applications are thereby made possible. Attachment may also be achieved with sticky tape, Velcro, snaps, hasps, and clasps, or any other like attachment means.

A tight fit for video equipment may be achieved with the backbone piece of the camera base. The backbone may be faced with visco-elastic polymer to reduce felt, heard, and seen vibration.

The screw holes in the gimbal allow for the reversibility of the camera platform. When a user desires the back of the video equipment to brace against the backbone of the gimbal, the thumbscrew will be on the right side of the bracket when the base is on the user's left side. If the user needs the support of the Backbone facing the other direction, there is a thumbscrew accepting threaded hole on the opposite side which allows for complete reversibility of the gimbal.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for securing video equipment to an object, said system comprising:
    a gimbal enabled to accommodate at least one type of video equipment;
    a dampener acceptor, said dampener acceptor comprising an acceptor ring, a ball comprised of power lines and a shaft, said dampener acceptor having an opening;
    a dampener positioned within said opening within said opening of said dampener acceptor;
    a base pedestal comprising a shaft opening attachable to said dampener acceptor, wherein said shaft of said dampener acceptor is insertable into said base pedestal;
    a quick release replaceable base attached to said base pedestal;
    wherein said system is attachable to a vibration causing object by an adaptor base, and wherein said adaptor base is connected to said quick release replaceable base.

2. The system of claim 1, wherein said dampener is made of a visco-elastic polymer.

3. The system of claim 1, wherein said dampener is made of an elastic, amorphous substance having a frequency that is lower than the audio frequency bandwidth and wherein said dampener absorbs vibration throughout the audio frequency spectrum from 10 to 30,000 hz.

4. The system of claim 1, wherein said dampener comprises stacked cylinders that are concentric and uni-axial.

5. The system of claim 4, wherein said stacked cylinders are of varying radii.

6. The system of claim 1, wherein said system further comprises a thumbscrew for tightening said gimbal on said dampener acceptor.

7. The system of claim 1, wherein said system further comprises an insert to said adaptor base enabled to fit within a substantially round opening in said adaptor base.

8. The system of claim 7, wherein said insert is comprised of a polymer.

9. The system of claim 7, wherein said insert is comprised of rubber.

* * * * *